United States Patent [19]

Hiramatsu et al.

[11] Patent Number: 5,416,828
[45] Date of Patent: May 16, 1995

[54] INTERFACE DEVICE FOR AN AUTOMOBILE TELEPHONE-SET WITH A DATA TRANSMISSION DEVICE

[75] Inventors: Shoji Hiramatsu; Yoshifumi Iwata, both of Aichi, Japan

[73] Assignee: Aisin Seiki Kabushiki Kaisha, Kariya, Japan

[21] Appl. No.: 35,240

[22] Filed: Mar. 23, 1993

[30] Foreign Application Priority Data

Mar. 27, 1992 [JP] Japan .................. 4-071544

[51] Int. Cl.⁶ .......................................... H04M 11/00
[52] U.S. Cl. ...................... 379/58; 379/100; 358/407; 358/442
[58] Field of Search ............. 379/58, 59, 100, 209; 358/407, 434, 436, 440, 442

[56] References Cited

U.S. PATENT DOCUMENTS

| | | | |
|---|---|---|---|
| 4,113,991 | 9/1978 | Gorham et al. | 379/209 |
| 4,881,129 | 11/1989 | Mitsuhashi | 379/100 |
| 4,922,546 | 5/1990 | Takahashi et al. | 379/100 |

FOREIGN PATENT DOCUMENTS

| | | | |
|---|---|---|---|
| 257051 | 2/1990 | Japan . | |
| 257052 | 2/1990 | Japan . | |
| 0264544 | 10/1990 | Japan | 379/100 |
| 3247065 | 11/1991 | Japan . | |
| 3265254 | 11/1991 | Japan | 379/100 |
| 3265348 | 11/1991 | Japan . | |

*Primary Examiner*—Curtis Kuntz
*Assistant Examiner*—Dwayne D. Bost
*Attorney, Agent, or Firm*—Sughrue, Mion, Zinn, Macpeak & Seas

[57] ABSTRACT

An interface device for an automobile telephone-set with a data transmission device-includes a switch for selectively connecting voice lines of a radio-transmitter/receiver to one of the telephone-set and the data transmission device, a distinguishing device for distinguishing dial data transmitted from the telephone-set and a control unit for energizing the switch and for connecting the voice lines of the radio transmitter/receiver to the data transmission device upon receiving a redial request from the data transmission device. When the user operates the telephone-set, an off-hook signal is transmitted from the telephone-set to the remote terminal through the radio transmitter/receiver. At this moment, the distinguishing device distinguishes the dial data which is transmitted from the telephone-set. The dial data is memorized in the data transmission device in case of a busy or not answerable situation at the remote terminal. When the redial request is generated by the data transmission device, the control unit transmits the memorized dial data to the radio transmitter in order to call the remote terminal without any manual operation of the telephone-set. Further, the control unit energizes the switch in order to connect the voice lines of the radio transmitter/receiver to the data transmission device. Thus the data transmission device is capable of redialing automatically through the control unit with hands-free operation during the driving automobile.

8 Claims, 2 Drawing Sheets

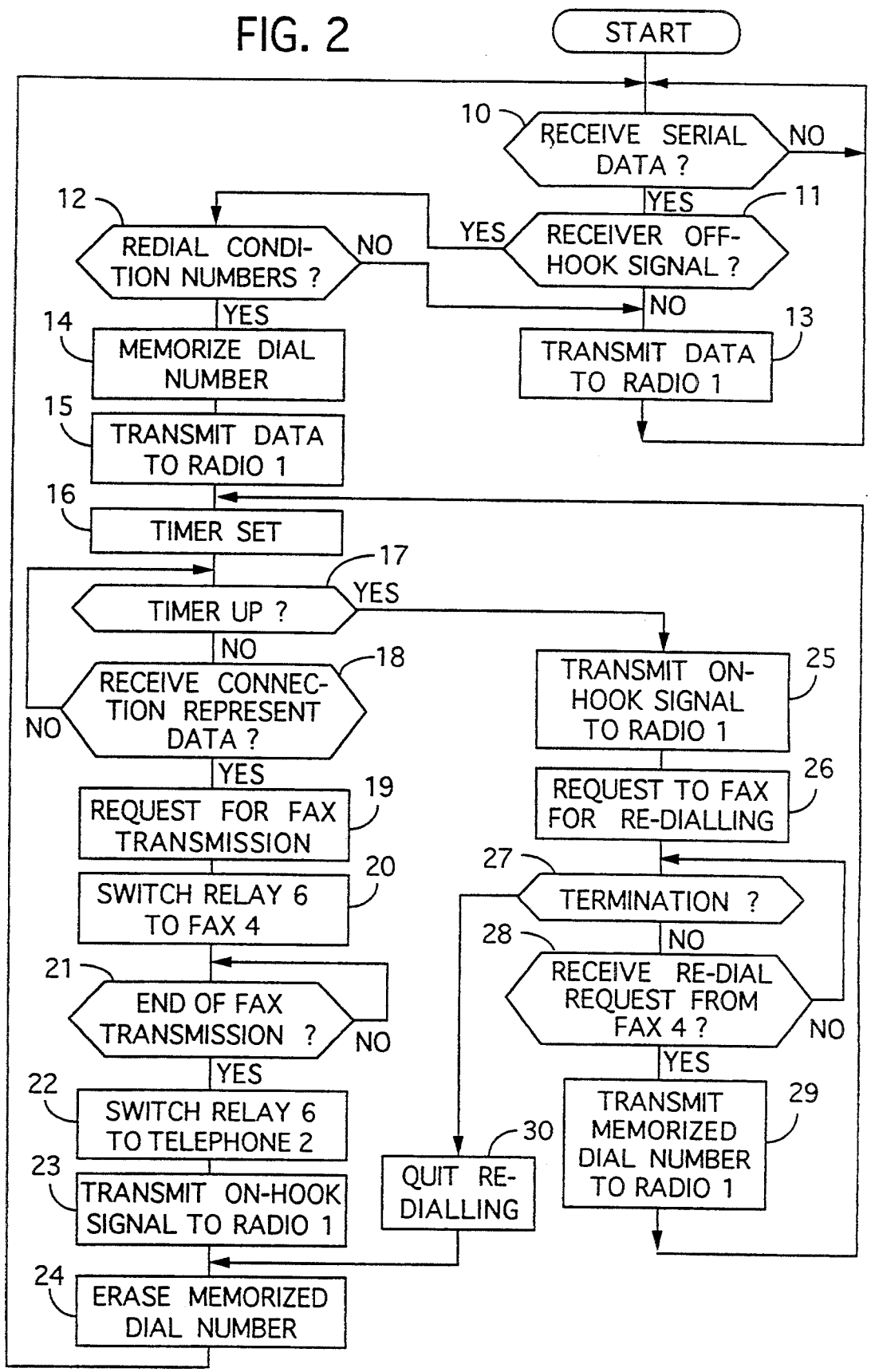

INTERFACE DEVICE FOR AN AUTOMOBILE TELEPHONE-SET WITH A DATA TRANSMISSION DEVICE

BACKGROUND OF THE INVENTION

This invention relates to an interface device for any automobile telephone which includes a data transmission device.

A conventional telephone for an automobile includes a radio transmitter/receiver and a telephone-set. The telephone-set is connected to the radio transmitter/receiver via two voice lines and two serial data lines. Usually, an interface device, which is often called a Network Control Unit, is interconnected between the radio transmitter/receiver and the telephone-set. The interface device includes a switch which selectively connects the radio transmitter/receiver to one of the telephone-sets and a data transmission device through the voice lines.

When the user wishes to transmit some data to a remote terminal, the user manually operates the dial from the telephone-set in order to connect the data transmission device to the remote terminal.

Such a conventional device is disclosed in Japanese Laid Open Patent No. HO2-57051 and No. HO3-265348.

In the conventional telephone device, however, the user has to operate the telephone-set manually before transmitting data to the remote terminal. Therefore, the user has to ring off or redial in the case of a busy or not answerable situation at the remote terminal.

SUMMARY OF THE INVENTION

Accordingly, one of the objects of the present invention is to solve the above conventional drawbacks.

One of the objects of the present invention is to make a redial call automatically from a data transmission device.

One of the objects of the present invention is to make a redial call automatically from the data transmission device with hands-free operation during the driving of an automobile.

To achieve the above objects, an interface device for an automobile telephone-set with a data transmission device comprises switching means for selectively connecting voice lines of a radio transmitter/receiver to one of the telephone-set and the data transmission device, distinguishing means for distinguishing dial data transmitted from the telephone-set, and control means for energizing the switching means and for connecting the voice lines of the radio transmitter/receiver to the data transmission device upon receiving a redial request from the data transmission device.

When the user operates the telephone-set, an off-hook signal is transmitted from the telephone-set to the remote terminal through the radio transmitter/receiver. At this moment, the distinguishing means distinguishes the dial data which is transmitted from the telephone-set. The dial data is memorized in the data transmission device in the case of a busy or not answerable situation at the remote terminal. When the redial request is generated by the data transmission device, the control means transmits the memorized dial data to the radio transmitter in order to call the remote terminal without any manual operation of the telephone-set. Further, the control means energizes the switching means in order to connect the voice lines of the radio transmitter/receiver to the data transmission device. Thus the data transmission device is capable of redialing automatically through the control means. The user does not operate the telephone-set manually when making a redial.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a flow chart showing procedures executed in an interface device.

DETAILED DESCRIPTION OF THE INVENTION

Figure 1:
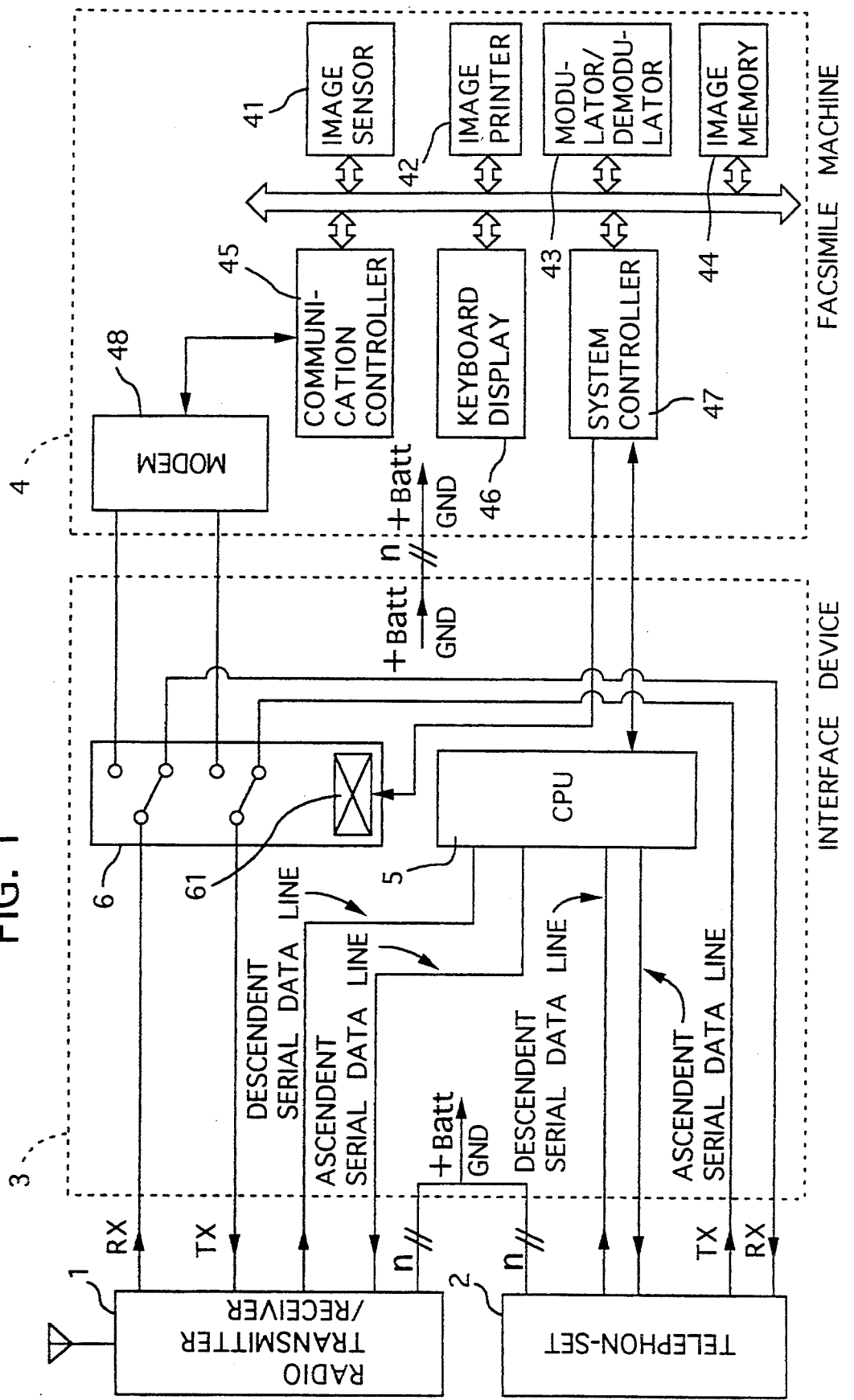
FIG. 1 is a block diagram of an interface device for an automobile telephone-set with a data transmission device.

In FIG. 1, an interface device 3 is interconnected between a radio transmitter/receiver 1 and a telephone-set 2. The radio transmitter/receiver 1 and the telephone-set 2 are used for a conventional automobile telephone.

The interface device 3 is also connected to a facsimile machine 4 which is a data transmission device.

The facsimile machine 4 includes many parts such as an image sensor 41,, an image printer 42, a modulator/demodulator 43, an image memory 44, a communication controller 45, a keyboard with a display 46, a system controller 47 and a modem 48. Scanning image and/or printing image are performed by the image sensor 41, the image printer 42, the modulator/demodulator 43 and the image memory 44. Further, the communication controller 45 transmits and/or receives the image data to/from a remote terminal.

The interface device 3 includes a relay switch 6 which selectively connects the radio transmitter/receiver 1 to one of the telephone-sets 2 and the modem of the facsimile machine 4 through the voice lines TX and RX. The interface device 3 further includes a central processing unit (i.e. CPU) 5. The CPU 5 is connected to the radio transmitter/receiver 1, the telephone-set 2 and the facsimile machine 4 through the serial data transmitting and receiving lines. The CPU 5 usually receives the serial data from the telephone-set 2 and transmits the received serial data to the radio transmitter/receiver 1. At the same time, the CPU 5 picks date from the received serial data which is required for the facsimile machine 4 and transmits the picked up data to the system controller 47 of the facsimile machine 4.

The relay switch 6 normally connects the voice lines TX and RX of the radio transmitter/receiver 1 to the telephone-set 2. By energizing the solenoid 61, the relay switch 6 is capable of switching the voice lines TX and RX of the radio transmitter/receiver 1 from the telephone-set 2 to the facsimile machine 4.

The user manually operates the telephone-set 2 in order to call the remote terminal before transmitting the image through the facsimile machine 4. The CPU 5 watches the serial data received from the radio transmitter/receiver 1 so as to confirm the connection to the remote terminal. After confirming the connection to the remote terminal, the CPU 5 energizes the solenoid 61 of the relay switch 6 so that the voice lines TX and RX of the radio transmitter/receiver 1 are connected to the facsimile machine 4. The facsimile machine 4 scans the image by the image reader 41 and transmits the image data to the radio transmitter/receiver 1 through the communication controller 45 and the modem 48.

In case of receiving an image from the remote terminal, the CPU 5 watches the serial data received from the radio transmitter/receiver 1 in order to confirm a request for facsimile reception. After confirming the request for facsimile reception, the CPU 5 drives the solenoid 61 of the relay switch 6 so that the radio transmitter/receiver 1 is connected to the facsimile machine 4 through the voice lines TX and RX. At the same time, the CPU 5 transmits the data to the system controller 47 of the facsimile machine 4. Then the image data which is received by the radio transmitter/receiver 1 is transmitted to the modem 48 of the facsimile machine 4. The modem 48 demodulates the received image data and transits the demodulated image data to the communication controller 45. The communication controller 45 controls the image printer 42 in order to print the image on paper.

Referring now to FIG. 2, procedures which are executed by the interface device 3 will be explained.

At step 10, the CPU 5 judges whether the serial data is received from the telephone-set 2 or note, or whether the serial data is received from the radio transmitter/receiver. If the serial data is not received from the telephone-set 2, the CPU 5 repeatedly executes step 10. If the CPU 5 receives the serial from the radio transmitter/receiver, the CPU 5 transmits the received data as it is to the telephone-set 2 and the facsimile machine 4.

At step 11, the CPU 5 judges whether the received data includes the off-hook signal or not. The off-hook signal includes dial start data, dial number data and dial end data. The CPU 5 judges the off-hook state when these three data are sequentially received by the CPU 5. If the received data does not include the off-hook signal, the CPU 5 executes the next step 13.

At step 13, the CPU 5 transmits the received data to the radio transmitter/receiver 1 and returns to step 10.

If the received data includes the off-hook signal at step 12, the CPU 5 judges whether the received dial number data includes redial condition numbers or not. The redial condition numbers are preregistered numbers which are registered by the user in a one-touch dial bank (not shown) in advance. If the dial number data which is received from the telephone-set 2 is not included in the redial condition numbers, the CPU transmits the received data to the radio transmitter/receiver 1 at step 13 and returns to step 10. The CPU 5 executes step 14 if the received dial number data is included in the redial condition numbers.

At step 14, the CPU 5 memorizes the received dial number data.

At step 15, the CPU 5 transmits the received serial data to the radio transmitter/receiver 1.

At step 16, the CPU 5 sets predetermined time period to an internal timer (not shown) and starts the timer. The predetermined time period is preferably 1 minute. However, the 1 minute may be varied by the design choice.

At step 17, the CPU 5 judges whether the internal timer is up or not. Further, at step 18, the CPU 5 judges whether connection represent data is received from the radio transmitter/receiver 1 or not. The connection represent data is generated after the remote terminal is in the off-hook state. If the connection represent data is not received by the CPU 5 before the timer is up, the CPU 5 recognizes that the remote terminal is in a busy or not answerable state and the CPU executes next step 25. The CPU 5 executes next step 19, if the connection data is received from the radio transmitter/receiver 1.

At step 19, the CPU 5 transmits a command to the facsimile machine 4 in order to start transmitting the image data.

At step 20, the CPU 5 energizes the solenoid 61 of the relay switch 6 so that the voice lines TX and RX of the radio transmitter/receiver 1 are connected to the facsimile machine 4.

At step 21, the CPU 5 waits for the end of image data transmission of the facsimile machine 4.

At step 22, after ending the transmission of the image data, the CPU 5 switches off the solenoid 61 of the relay switch 6 so that the voice lines TX and RX of the radio transmitter/receiver 1 are connected to the telephone-set 2.

At step 23, the CPU 5 transmits on-hook signal to the radio transmitter/receiver 1.

At step 24, the CPU 5 finally erases the dialing number which is stored in the CPU 5 and then returns to step 10.

At step 25, the CPU 5 transmits on-hook signal to the radio transmitter/receiver 1.

At step 26, the CPU 5 transmits a redial and automatic facsimile transmission request to the facsimile machine 4.

At step 27, the CPU 5 judges whether the user requests the termination or not. When the user operates the termination switch (not shown) which is included in the keyboard of the telephone-set 2, the CPU 5 recognizes that the user requests the termination. The termination request is transmitted from the telephone-set 2 to the CPU 5 through the serial data lines. After receiving the termination request at step 27, the CPU 5 executes next step 30.

At step 28, the CPU 5 judges whether the redial request is received from the facsimile machine 4 or not. Then the CPU 5 returns to step 27 and repeatedly executes steps 27 and 28 until receiving the termination request from the telephone-set 2 or receiving the redial request from the facsimile machine 4. The facsimile machine 4 is programmed to transmit the redial request to the CPU 5 at 1 minute intervals.

At step 29, when the CPU 5 receives the redialing request from the facsimile machine 4 during the waiting time at steps 27 and 28, the CPU 5 generates the dial number data based on the dial number memorized in the CPU 5.

At step 30, the facsimile machine 4 quits redialing and automatic transmitting of image data. After that, the CPU 5 executes step 24 in order to erase the memorized dial number and returns to step 10. If the termination request is not received by the CPU 5 at step 27, next step 28 is executed.

At step 28, the CPU 5 judges whether the redial request is received from the facsimile machine 4 or not. Then the CPU 5 returns to step 27 and repeatedly executes steps 27 and 28 until receiving the termination request from the telephone-set 2 or receiving the redial request from the facsimile machine 4. The facsimile machine 4 is programmed to transmit the redial request to the CPU 5 at 1 minute intervals.

At step 29, when the CPU 5 receives the redialing request from the facsimile machine 4 during the waiting time at steps 27 and 28, the CPU 5 generates the dial number data based on the dial number memorized in the CPU 5. The CPU 5 transmits the dial number data to the radio transmitter/receiver 1 through the serial data lines. After executing step 29, the CPU 5 execute the next step 16.

In the procedures shown in FIG. 2, the CPU 5 makes redial only when the dial number data which is received from the telephone set 2 coincides with one of the redial condition numbers. When the user wishes to speak to someone at the remote terminal, the user may use the other dial number which may not be included in the redial condition numbers. Therefore, the serial data flows freely through the serial data lines between the radio transmitter/receiver 1 and telephone-set 2, and voice lines TX and RX are connected between the radio transmitter/receiver 1 and telephone-set 2. Thus the usual telephone conversation is performed by the other dial number which is different from the redial condition numbers.

When the user dials the redial condition numbers, the user may ring off in the case of a busy or not answerable situation at the remote terminal. Unless the user operates the termination switch, the facsimile machine 4 may automatically generate the redial request. In response to the redial request, the CPU 5 of the interface device 3 transmits the dial number data to the radio transmitter/receiver 1. Therefore, the user does not need to operate the dial again but the interface device 3 makes redials.

In this embodiment, steps 10, 11 and 12 are the steps for distinguishing dial data transmitted from the telephone-set 2. Further, steps 28 and 20 are the steps for energizing the switching means 6 and for connecting the voice lines of the radio transmitter/receiver 1 to the data transmission device 4 in case of receiving a redial request from the data transmission device 4.

In this embodiment, at steps 14-29, the CPU 5 does not transmit the serial data from the telephone-set 2 to the radio transmitter/receiver 1, but ignores the serial data which is transmitted from the telephone-set 2. Therefore, the redial request which is received from the data transmission device 4 is not interfered by the serial signal which is transmitted from the telephone-set 2, unless the termination switch is activated.

In this embodiment, the redial operation is performed only for the preregistered redial condition numbers. Therefore, the voice lines TX and RX are always connected between the radio transmitter/receiver 1 and the telephone-set 2, if the dial numbers are not included in the preregistered redial condition numbers. Therefore, the usual telephone conversation is performed by the other dial number which is different from the redial condition numbers.

In this embodiment, the termination switch is used for terminating the redial operation. However, it is also preferable that some combination of secret numbers are used for terminating the redial operation.

It is also preferable that the CPU 5 transmits a command to the telephone-set 2 during the redial operation in order to inhibit the transmission of the serial signal toward the radio transmitter/receiver 1.

It is also preferable that the CPU 5 memorizes the facsimile dial numbers in order to discriminate the facsimile dial numbers from the other dial numbers. In this modification, the redial operation is allowed only to the facsimile dial number, but is not permitted for the dial numbers for a usual telephone conversation.

In this embodiment, the termination switch is provided on the telephone-set 2. Therefore, the user easily terminates the redial operation from the telephone-set 2.

While the invention has been particularly shown and described with reference to preferred embodiments thereof, it will be understood by those in the art that the foregoing and other changes in form and details may be made therein without departing from the spirit and scope of the invention.

What is claimed is:

1. An interface device for an automobile telephone-set with a data transmission device comprising:
    switching means for selectively connecting voice lines connected to a radio transmitter/receiver to lines connected to one of a telephone-set and a data transmission device,
    distinguishing means for distinguishing dial data transmitted from the telephone-set, and
    control means for energizing the switching means and for connecting the voice lines of the radio transmitter/receiver to the data transmission device upon receiving a redial request from the data transmission device.

2. The device in claim 1, wherein the control means is interconnected between the radio transmitter/receiver and telephone-set through serial data lines and inhibits the data transmission from the telephone-set to the radio transmitter/receiver during the energizing of the switching means.

3. The device in claim 1, wherein the distinguishing means distinguishes a facsimile dial number and the control means operates only when the facsimile number is called.

4. The device in claim 1 wherein the control means transmits a command for terminating the redial operation of the data transmission device when the telephone-set transmits predetermined data.

5. An interface device in combination with an automobile telephone-set, a radio transmitter/receiver and a data transmission device, said interface device comprising:
    switching means for selectively connecting voice lines of said radio transmitter/receiver to one of the telephone-set and the data transmission device;
    distinguishing means for distinguishing dial data transmitted from the telephone-set to said interface device; and
    control means for energizing the switching means and for connecting the voice lines of the radio transmitter/receiver to the data transmission device upon receiving a redial request from the data transmission device.

6. The combination as set forth in claim 5, wherein the control means is interconnected between the radio transmitter/receiver and telephone-set through serial data lines and inhibits data transmission from the telephone-set to the radio transmitter/receiver when the switching means is energized.

7. The combination as set forth in claim 5, wherein said distinguishing means distinguishes a facsimile dial number and said control means operates only when the facsimile dial number is called.

8. The combination as set forth in claim 5, wherein said control means transmits a command for terminating a redial operation of the data transmission device when the telephone-set transmits predetermined data.

* * * * *